United States Patent [19]

Aschwanden

[11] 4,184,174
[45] Jan. 15, 1980

[54] COMB FILTER SYSTEM

[75] Inventor: Felix Aschwanden, Thalwil, Switzerland

[73] Assignee: RCA Corporation, New York, N.Y.

[21] Appl. No.: 869,107

[22] Filed: Jan. 13, 1978

[30] Foreign Application Priority Data

Jan. 20, 1977 [GB] United Kingdom ............ 02374/77

[51] Int. Cl.² .......................................... H04N 9/535
[52] U.S. Cl. ..................................................... 358/31
[58] Field of Search ................ 358/31, 152; 333/70 R

[56] References Cited

U.S. PATENT DOCUMENTS

| | | | |
|---|---|---|---|
| 2,913,540 | 11/1959 | Luther | 330/53 |
| 3,546,372 | 12/1970 | Dischert et al. | 358/37 |
| 3,872,498 | 3/1975 | Pritchard | 358/21 |
| 3,895,393 | 7/1975 | Drummond et al. | 358/31 |
| 3,969,757 | 7/1976 | Amery | 358/4 |
| 4,003,079 | 1/1977 | Woo | 358/31 |
| 4,074,321 | 2/1978 | Miller | 358/31 |
| 4,096,516 | 6/1978 | Pritchard | 358/31 |

*Primary Examiner*—Richard Murray
*Attorney, Agent, or Firm*—Eugene M. Whitacre; William H. Meagher

[57] ABSTRACT

In apparatus for playback of a video disc record bearing chrominance information recorded in "buried subcarrier" format, a comb filter involving subtractive combination of the input and output of a 1H delay line is used to separate chrominance component of recorded composite signal from accompanying luminance signal. Separated chrominance component is subject to demodulation to obtain color difference signals, which are applied to a SECAM modulator to obtain SECAM format signal for delivery to SECAM type color TV receivers. To reduce "cross-color" effects of diagonal luminance components, a second comb filter is interposed between first comb filter and color demodulators. Second comb filter employs 1H delay line with receiving end misterminated by a short circuit termination to obtain reflection effect. Signal at sending end, comprising sum of input composite signal and reflected, 2H delayed signal is matrixed with undelayed composite signal to obtain effect of comb filter with recurring peaks separated by half line frequency ($f_H/2$) intervals.

18 Claims, 5 Drawing Figures

COMB FILTER SYSTEM

The present invention relates generally to comb filter systems, and particularly to comb filter systems of a novel form facilitating their use in effecting the separation of frequency interleaved components of a composite signal.

In various systems currently employed for storing color picture information in the track of a disc record, effective bandwidth limitations militate against recording color television signals in encoding formats of standard NTSC, PAL, or SECAM type. In U.S. Pat. No. 3,872,498—Pritchard, a non-standard color television signal encoding format of a so-called "buried subcarrier" form is disclosed as particularly advantageous for video disc recording purposes. In the buried subcarrier format, the chrominance signal falls in a midband portion (e.g., 1-2 MHz.) of the luminance signal. Comb filtering of the luminance signal prior to combination with the chrominance signal prepares signal-free troughs in the midband portion of the luminance signal, while comb filtering of the chrominance signal prior to the combination substantially confines the chrominance signal components to the aforesaid trough regions.

In illustrative applications of the buried subcarrier approach, as disclosed in U.S. Pat. No. 3,872,498, the color encoding employed with the buried subcarrier is akin to NTSC encoding in (1) employing a subcarrier frequency choice substantially corresponding to an odd multiple of half the line frequency (whereby there is a half-line frequency offset between the luminance and buried subcarrier sideband spectra), and (2) forming the modulated subcarrier by summing (a) the resultant of modulating a first subcarrier component of a first constant phase with a first color-difference signal, such as R-Y, with (b) the resultant of modulating a second subcarrier component of a second constant phase (in quadrature relation to the first constant phase) with a second color-difference signal, such as B-Y (with the consequence that there is only a phase offset between the two subcarrier components).

When color encoding of the above-described type is employed with the buried subcarrier approach in preparation of a recording signal, the subsequent separation of the luminance and chrominance components of the buried subcarrier signal, upon playback of the disc recording, is facilitated. The separation may be effected, for example, through use of a comb filtering system of a type employing a single 1H delay line, such as shown for example, in U.S. Pat. No. 3,969,757.

In contrast, when color encoding of a PAL type (involving line-by-line alternation of one subcarrier component) is employed with the buried subcarrier approach in preparation of a recording signal, the subsequent separation of luminance and chrominance components of the buried subcarrier, upon playback of the disc recording, is not facilitated. That is, with subcarrier frequency choice, in the PAL fashion, to substantially correspond to an odd multiple of one-quarter of the line frequency, the recorded signal would have only a quarter-line frequency offset between the luminance and buried subcarrier sideband spectra. With such an offset, adequate separation of luminance and buried subcarrier sideband components in playback operations cannot be achieved with comb filters of a simple type employing a single 1H delay line. Moreover, the dot pattern associated with display of any residual buried subcarrier components of a PAL type of buried subcarrier signal is more objectionable than the dot pattern associated with a half-line frequency offset buried subcarrier signal of the previously mentioned non-PAL type disclosed in U.S. Pat. No. 3,872,498.

Use of color encoding in a SECAM fashion is not feasible with the buried subcarrier approach, since the varying frequency spacing between FM subcarrier components and the luminance spectra effectively preclude use of the desired comb filter actions in recording signal formation and playback signal processing.

In a copending U.S. patent application, Ser. No. 822,659, of P. S. Carnt, et al., it is proposed that a color encoding format, employing the buried subcarrier approach of U.S. Pat. No. 3,872,498, with (1) a substantially half-line frequency offset between luminance and buried subcarrier sideband spectra, and (2) with only a phase offset between the respective pair of subcarrier components, should be employed in the recording of discs for use with both (1) disc players designed to provide PAL-type outputs for driving PAL-type color television receivers, and (2) disc players designed to provide SECAM-type outputs for driving SECAM-type color television receivers.

It is further proposed in said Carnt, et al. application that the precise frequency choice for the buried subcarrier employed in recording signal formation differ slightly from an odd integral multiple of half the line frequency, with the slight difference corresponding substantially to half the field frequency. This difference is so slight that it has no significant adverse effect on the accuracy of component separation achieved with comb filters employing 1H delay lines. However, the imposition of this additional half-field frequency offset can provide a desirable result of effectively lessening the visibility of a dot pattern produced by display of residual buried subcarrier components through alteration of the appearance of the pattern crawl. An illustrative choice for the buried subcarrier frequency in said Carnt, et al. application is 1,476,587.5 Hz, corresponding to the sum of (a) one-half a field frequency of 50 Hz, and (b) 189 times one-half of a line frequency of 15,625 Hz.

In the standard NTSC signal, the modulated color subcarrier waves are accompanied by color synchronizing information in the form of periodic bursts of color subcarrier frequency waves of constant amplitude and constant phase, each burst occurring during the "backporch" interval following a horizontal synchronizing pulse and having a −(B-Y) phase, 180° away from the phase of the subcarrier component subject to modulation of +(B-Y) color difference signals. In the standard PAL signal, color synchronizing bursts are also provided during such backporch interval; the PAL burst, however, is subject to a line-by-line alternation of its phasing between a phase lagging the −(B-Y) phase by 45°, and a phase leading the −(B-Y) phase by 45°. For the recording purposes of the Carnt, et al. application, it is there proposed that the modulated buried subcarrier waves should be accompanied by color synchronizing bursts of buried subcarrier frequency, which are akin to the standard NTSC bursts in having phase constancy (free from the line-by-line phase changes of the PAL "swinging burst"), but differing from the standard NTSC bursts in that the constant phase of the bursts differs from the −(B-Y) phase by 45°. The sense of the 45° difference is desirably such that it corresponds to the phasing of the resultant of summing equal amplitude buried subcarrier components of +(R-Y) and −(B-Y)

phasing, respectively. The use of the above-described form for the buried subcarrier bursts facilitates a subsequent transformation of the buried subcarrier signal (e.g., in a disc player) to a form suitable for driving PAL-type color television receivers (without disturbance to an alternative transformation of the buried subcarrier signal to a form suitable for driving SECAM-type color television receivers).

The standard PAL signal has a "meandering" burst blanking during successive vertical blanking intervals, which is such that the last and first bursts of each field have the same phase. The burst blanking is effected within a period having a width of 9 lines, which period effectively advances in half-line steps, when the field order is taken as 4, 1, 2, 3 (as illustrated, for example, on page 30 of the Carnt-Townsend book, entitled "Colour Television—Volume 2," and published in 1969 by Iliffe Books, Ltd., London, England). For the recording signal formation purposes of the Carnt, et al. application, the buried subcarrier burst blanking is desirably effected with a similar form of "meander" (i.e., effected within a period having a width of 9 lines, which period effectively advances in half-line steps, when the field order is taken as 4, 1, 2, 3, as shown in the aforesaid book), even though all of the buried subcarrier bursts are of the same phase. The presence of the aforesaid meander of the buried subcarrier burst blanking period facilitates a subsequent player transformation of the buried subcarrier signal to a form capable of driving a PAL-type color television receiver with minimum disturbance of the receiver's reference carrier generator at each field beginning (without adverse effect on an alternative transformation of the buried subcarrier signal to a form suitable for driving a SECAM-type color television receiver).

In an illustrative example of use of the modified buried subcarrier signal described in the Carnt, et al. application, the color-difference modulating signals have a bandwidth of 0–500 KHz., whereby the spectrum occupied by the sidebands of the buried subcarrier corresponds to 1.4765875 MHz.±500 KHz. (or approximately 1–2 MHz.). Illustratively, the accompanying luminance signal component is restricted to a bandwidth of 0–3 MHz. As in U.S. Pat. No. 3,872,498, prior to addition with the buried subcarrier sideband components, the luminance signal component is subject to combing, at least in the to-be-shared midband region (e.g., 1–2 MHz.), to prepare signal-free spectrum troughs for buried subcarrier sideband component occupancy. While the luminance component combing may extend beyond the midband boundaries, it is desirable that a low frequency portion (e.g., 0–900 KHz.) remain effectively uncombed, so as to permit retention in the recorded luminance signal of "vertical detail" information. The modulated color subcarrier waves are also subject to combing prior to addition with the luminance signal so as to substantially confine the buried subcarrier sideband components to the aforementioned trough regions. In a copending U.S. patent application, Ser. No. 808,295, of J. Clemens, et al., a description is provided of an advantageous form of transcoding apparatus which may be employed to transform a standard PAL signal into a buried subcarrier signal of the form described hereinabove.

In playback apparatus for records of the type described in said Carnt, et al. application, transcoding is effected to convert a recorded buried subcarrier into a PAL-type signal suitable for application to a conventional PAL color television receiver, or into a SECAM-type signal suitable for application to a SECAM-type color television receiver. Pursuant to advantageous playback aspects of the present invention, the player's transcoding arrangement desirably involves a decoding of modulated subcarrier waves recovered from the record to obtain baseband color-difference signal information, followed by remodulation of a carrier pursuant to a desired output format. The player's transcoding arrangement incorporates comb filters for separation of the luminance and chrominance components of the signal recovered from the record, with an up-conversion of the recovered signal preceding comb filtering. Pursuant to one illustrative player embodiment, as shown in FIG. 4 of the Carnt, et al. application, the up-conversion shifts the color subcarrier from its buried subcarrier value to a frequency, in the vicinity of the standard PAL subcarrier frequency, but bearing an odd integral multiple relationship to half the line frequency. With such a form of up-conversion direct adoption of the comb filter forms shown in the aforementioned U.S. Pat. No. 3,969,757 is convenient. In alternative illustrative player embodiments, such as are shown in FIGS. 2 and 3 of the Carnt, et al. application, the up-conversion shifts the color subcarrier to the standard PAL subcarrier frequency (which does not bear the aforesaid relationship to half the line frequency). With use of the latter form of up-conversion, departures from the comb filter forms of the aforesaid U.S. Pat. No. 3,969,757 are desirable employed to obtain satisfactory component separation.

In the copending U.S. patent application, Ser. No. 851,780, of F. Aschwanden, novel modulator apparatus is disclosed for encoding signals in a SECAM format. As indicated in said copending Aschwanden patent application, such modulator apparatus may conveniently serve the remodulation function required in SECAM-output versions of the video disc player described in the aforementioned Carnt, et al. application.

In accordance with the principles of the present invention, a novel comb filter system is formed by the cascading of a pair of comb filters, wherein the frequency response characteristic of one of said pair of comb filters exhibits a first plurality of regularly spaced response peaks, with the frequency separation between adjacent ones of said first plurality of regularly spaced response peaks corresponding to a first frequency; wherein the frequency response characteristic of the other of said pair of comb filters exhibits a second plurality of regularly spaced response peaks, with the frequency separation between adjacent ones of said second plurality of regularly spaced response peaks corresponding to a second frequency, different from said first frequency; and, wherein the frequency of a response peak of said first plurality is substantially coincident with the frequency of a response peak of said second plurality. The effect of cascading comb filters with characteristics related in the manner described above is the formation of a comb filter system with an overall frequency response characteristic of a novel form, advantageous for use in the separation of frequency interleaved components of a composite signal.

In accordance with an illustrative embodiment of the present invention, the first frequency corresponds to the line frequency ($f_H$) of a television system, while the second frequency corresponds to half said line frequency (i.e., corresponds to $f_H/2$), and the response peak dispositions are such that the overall response characteristic exhibits a plurality of relatively narrow pass bands centered about odd integral multiples of $f_H/2$, with nulls therebetween appearing not only at even integral multiples of $f_H/2$, but also at frequencies corresponding to an even integral multiple of $f_H/2$, plus $f_H/4$, and at frequencies corresponding to an even integral multiple of $f_H/2$, minus $f_H/4$. In an illustrative use of the aforesaid invention embodiment, the comb filter system thus formed serves to effect separation of a chrominance component from said up-converted composite color television signal provided in video disc player apparatus of a type shown in FIG. 4 of the aforementioned Carnt, et al. patent application; and the output of the comb filter system thus formed is subject to demodulation to obtain color-difference signal inputs for SECAM modulator apparatus, illustratively of the type described in the aforesaid copending Aschwanden patent application. In such use of the novel comb filter system, undesired disturbances in color pictures reproduced by a SECAM color television receiver responding to the SECAM-style output of the video disc player, which might otherwise result from "cross-color" effects of "diagonal" luminance components, are substantially avoided.

Figure 1:
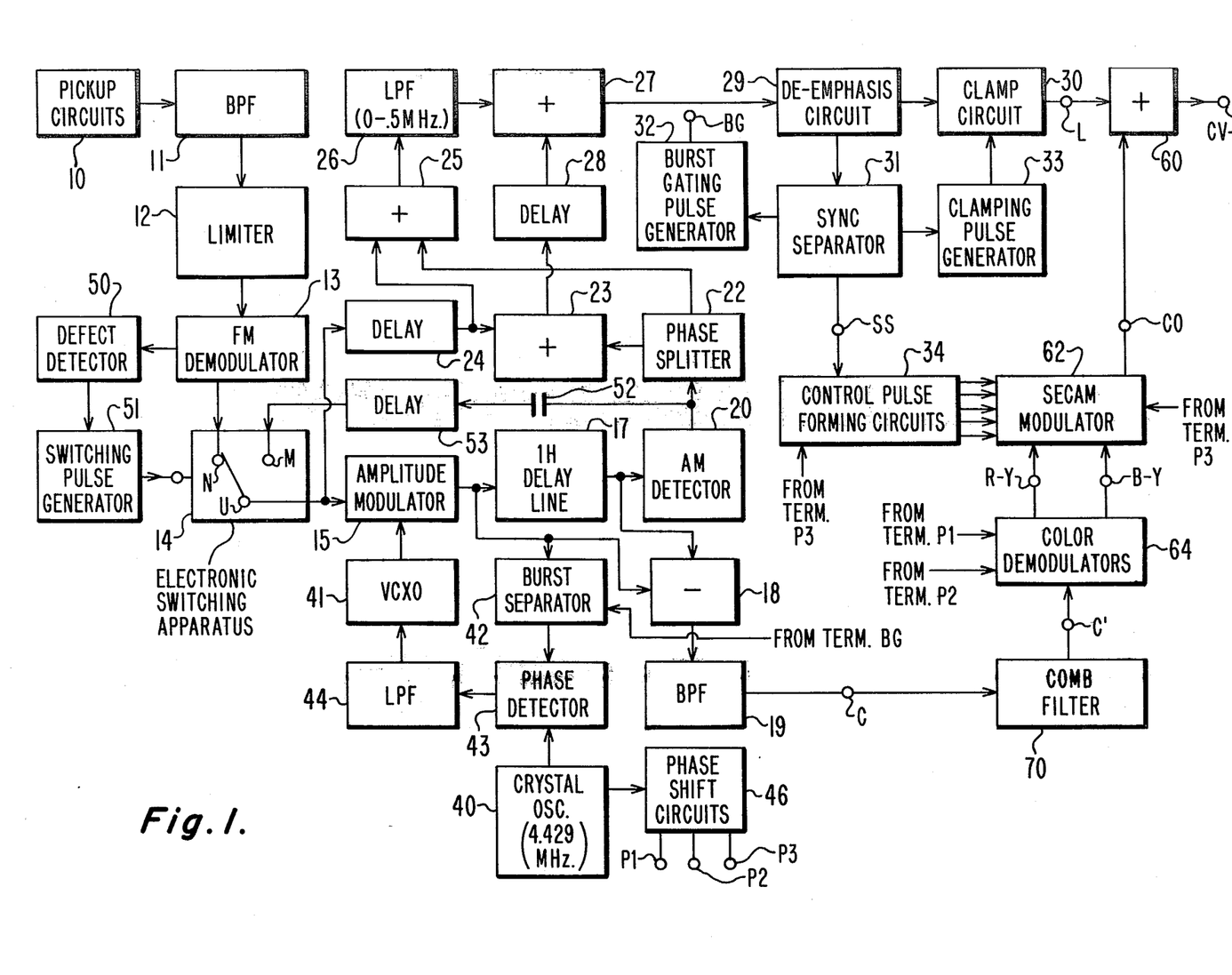
FIG. 1 illustrates video disc player apparatus of a SECAM-output type, incorporating a comb filter system in accordance with an embodiment of the present invention.

In FIG. 1, a video disc player is shown, of a general type described in the aforementioned Carnt, et al. application, suitable for playback of video disc records bearing color television signal information encoded in a modified "buried subcarrier" format also described in said Carnt, et al. application. Illustratively, such format employs a color subcarrier frequency of 1.4765875 MHz. (equal to the sum of one-half a field frequency of 50 Hz. and 189 times one-half of a line frequency of 15,625 Hz.). Quadrature-related phases of the color subcarrier are modulated by respective R-Y and B-Y color-difference signals (of 0–500 KHz. bandwidth) and summed to form a chrominance component, to accompany a luminance component restricted to a bandwidth of 0–3 MHz. As in U.S. Pat. No. 3,872,498, prior to addition with the buried subcarrier sideband components, the luminance signal component is subject to comb filtering, at least in a to-be-shared midband region (e.g., 1–2 MHz.), to prepare signal-free spectrum troughs for buried subcarrier sideband component occupancy. While the luminance component combing may extend beyond the midband boundaries, it is desirable that a low frequency portion (e.g., 0–900 KHz.) remain effectively uncombed, so as to permit retention in the recorded luminance signal of "vertical detail" information. The modulated color subcarrier waves are also subject to comb filtering prior to addition with the liminance signal so as to substantially confine the buried subcarrier sideband components to the aforementioned trough regions. The recorded signal comprises carrier frequency oscillations modulated in frequency (e.g., over a deviation range of 4.3 MHz. to 6.3 MHz.) in accordance with the amplitude of a composite signal formed by summing the above-described luminance and chrominance components.

In the FIG. 1 player, pickup circuits 10 deliver a recovered version of the recorded signal to a bandpass filter 11, having a pass band encompassing the deviation range of the recorded FM signal and appropriate sidebands thereof. The bandpass filter output is applied via a limiter 12 (removing spurious amplitude modulation) to the input of an FM demodulator 13. The output of FM demodulator 13, comprising a composite color television signal of the aforementioned modified buried subcarrier type, is supplied to an input terminal N of electronic switching apparatus 14, which, during normal signal recovery periods, conveys such signals to output terminal U of the switching apparatus.

The signals appearing at terminal U are applied to the modulating signal input of an amplitude modulator 15, which receives carrier frequency oscillations from a voltage controlled crystal oscillator (VCXO) 41. Modulator 15 serves to effect an up-conversion of the buried subcarrier chrominance component. With the nominal operating frequency of VCXO 41 corresponding to the sum of the buried subcarrier frequency (189 $f_H/2 + f_V/2$) and a frequency equal to 567 $f_H/2$ (or 4.4296875 MHz.), the output of modulator 15 includes a lower sideband in which the subcarrier frequency nominally falls at 4.4296875 MHz. (which will hereinafter be referred to as 4.429 MHz., for the sake of convenience).

To assure that the desired up-conversion is effected in the face of possible time base errors suffered in the recorded signal pickup process, control of VCXO 41 is effected by the filtered output of a phase detector 43 as delivered by low pass filter 44. The phase detector 43 is responsive to color synchronizing bursts of the up-converted signal separated from the modulator output by a burst separator 42, and to the output of a reference crystal oscillator 40. The reference frequency of the output of oscillator 40 is the aforementioned 4.429 MHz., the desired up-converted subcarrier frequency. The burst separator action is controlled by appropriately timed gating pulses supplied from terminal BG, and burst separator 42 incorporates frequency selective circuits appropriate to response to the lower sideband subcarrier component (to the exclusion of an upper sideband subcarrier component). The control of VCXO 41 opposes departures from frequency and phase synchronism between the outputs of separator 42 and oscillator 40, whereby stability of location of the up-converted color subcarrier at the desired odd integral multiple of half the line frequency is maintained.

Figure 2A:
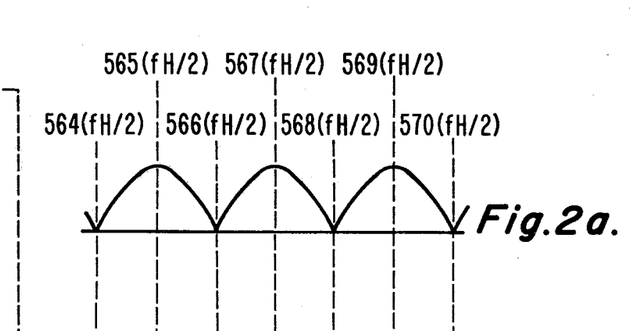
FIGS. 2a 2b and 2c illustrate graphically frequency response characteristics, of aid in explaining the operation of the FIG. 1 apparatus.

The output of modulator 15 is applied to a 1H delay line 17 (providing a delay corresponding to a period at $f_H$, i.e., 64 microseconds). The input and output of delay line 17 are subtractively combined in signal combiner 18 to obtain the effect of a comb filter having multiple passbands centered about odd integral multiples of half the line frequency, (permitting passage of the up-converted color subcarrier and its sideband components), and intervening rejection notches centered about even integral multiples of half the line frequency (rejecting interleaved luminance components). The regularly spaced response peaks of the frequency response characteristic (illustrated in FIG. 2a) of this comb filter exhibit a frequency spacing between adjoining response peaks which corresponds to the line frequency ($f_H$). Bandpass filter 19, coupled to the output of combiner 18, provides an output signal (at terminal C) confined to the bandwidth of the up-converted chrominance signal.

The output of delay line 17 is also applied to an amplitude modulation detector 20 to develop a delayed version of the baseband input signal appearing at terminal U. A phase splitter 22, coupled to the output of detector 20, develops a first delayed baseband signal output for additive combination with the input signal from terminal U in combiner 23, and a second delayed baseband signal output (phase inverted relative to the first output) for additive combination with the input signal from terminal U in combiner 25. The phasing of the first output is such that combiner 23 provides a comb filter of the type having rejection notches at odd integral multiples of half the line frequency, whereby the output of combiner 23 comprises luminance signal components substantially freed from accompaniment by buried color subcarrier components. A complementary comb filter characteristic is provided by combiner 25; lowpass filter 26, coupled to the output of combiner 25, and having an illustrative passband of 0–0.5 MHz., derives a vertical detail signal for ultimate recombination with luminance signal components present in the output of combiner 23.

A delay device 24 is interposed in the input signal path extending from terminal U to combiners 23 and 25. The function of the delay device 24 is to compensate for extra delay introduced in the path of the delay line output to the aforesaid combiners (e.g., extra delay contributed by output filters of detector 20) so as to ensure that the delay differences for the two inputs is of the desired 64 microsecond value.

An adder 27 combines vertical detail information supplied by filter 26 with luminance signal components passed by combiner 23. A delay device 28, interposed in the signal path from combiner 23 to adder 27, provides a delay substantially matching the delay associated with low pass filter 26, so that the respective components of the luminance signal are recombined in adder 27 with proper relative timing.

The output of adder 27 is applied to a de-emphasis circuit 29, having a frequency response characteristic complementary to that employed in pre-emphasis of high frequency components of the luminance signal (in formation of a recording signal). The output of de-emphasis circuit 29 is supplied to a keyed clamp circuit 30, which develops at terminal L a luminance signal with its DC component properly restored. The output of de-emphasis circuit 29 is also applied to a sync separator 31, which separates out the deflection synchronizing components of the recorded signal. A burst gating pulse generator 32, responding to an output of sync separator 31, develops burst gating pulses of suitable "backporch" timing for delivery to terminal BG. A clamping pulse generator 33, also responding to an output of sync separator 31, develops keying pulses, for application to clamp circuit 30, which are timed to coincide, for example, with an intermediate portion of each line sync interval. Separated line and field synchronizing components appear at an output terminal SS of sync separator 31. Circuitry for performing the functions of separator 31 and generators 32 and 33 may illustratively be shown in U.S. Pat. No. 4,057,826—Baker.

As explained previously, during normal signal pickup operations, the output of FM demodulator 13 is normally conveyed from terminal N to terminal U of switching apparatus 14. However, during signal defect conditions, as detected by a defect detector 50 coupled to FM demodulator 13, the normal signal path between terminals N and U is disrupted in response to the action of a switching pulse generator 51, controlled by detector 50. Under these conditions, a substitute signal is conveyed to terminal U from terminal M of switching apparatus 14. The substitute signal comprises a delayed baseband signal derived from the output of detector 20 and applied to terminal M via a signal path incorporating a coupling capacitor 52 and a delay device 53 (providing a delay corresponding to a half period at the buried subcarrier frequency). Reference may be made to U.S. Pat. No. 3,969,759—Amery for a more detailed explanation of this signal substitution technique, to U.S. Pat. No. 4,038,686—Baker for a description of illustrative circuitry for performing the function of defect detector 50, and to U.S. Pat. No. 3,909,518—Baker for a description of illustrative circuitry for performing the functions of generator 51 and switching apparatus 14.

The luminance signal appearing at terminal L is applied to an adder 60, for combination with a chrominance signal of SECAM form, to develop a composite color video output signal at terminal CV. The chrominance signal input to adder 60 is supplied from the output terminal CO of a SECAM modulator 62. SECAM modulator 62 is illustratively of the novel type described in the aforementioned copending Aschwanden application, and develops a chrominance signal output of the SECAM type in response to inputs comprising: (a) correlated red and blue color-difference signals, supplied to the color-difference signal input terminals R-Y and B-Y of the modulator; (b) reference oscillations, illustratively derived from terminal P3 of phase shift circuits 46 coupled to an output of reference oscillator 40; and (c) a plurality of control pulse trains developed by control pulse forming circuits 34 (as shown in said copending Aschwanden application) in response to inputs comprising the separated synchronizing components appearing at terminal SS, and reference oscillations appearing at terminal P3.

To develop the correlated red and blue color-difference signals required for application to the color-difference signal input terminals R-Y and B-Y of modulator 62, synchronous color demodulators 64 are provided, responding to the up-converted chrominance signal output of bandpass filter 19, and to appropriately phased reference oscillations of the up-converted subcarrier frequency (from terminals P1 and P2), derived by phase shift circuits 46 from an output of reference oscillator 40.

Figure 2B:
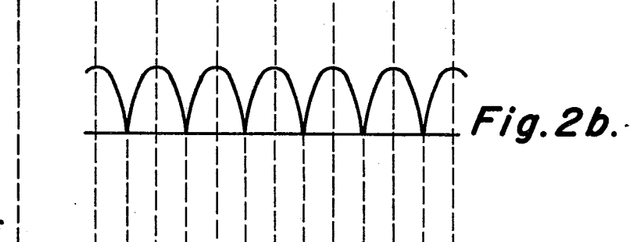

Pursuant to the principles of the present invention, the output of bandpass filter 19 (comprising a bandwidth limited portion of the output of the comb filter formed by elements 17 and 18) is not applied directly to the color demodulators 64, but rather via an additional comb filter 70 (having an output terminal C'). The additional comb filter 70 has a frequency response characteristic, as shown in FIG. 2b, which exhibits a plurality of regularly spaced response peaks, with the frequency spacing between adjacent response peaks corresponding to half the line frequency (i.e., corresponding to $f_H/2$). The response peak dispositions are such as to coincide with even integral multiples of quarter the line frequency ($f_H/4$), with nulls therebetween corresponding to odd integral multiples of $f_H/4$.

Figure 1A:
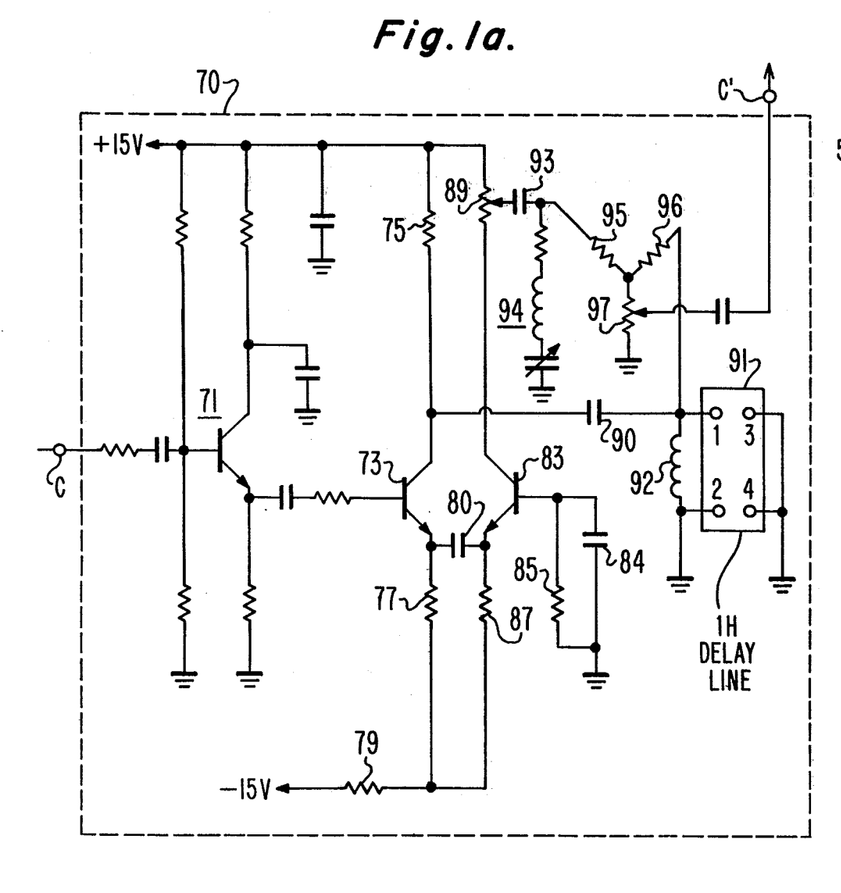
FIG. 1a illustrates schematically circuitry for implementing a comb filter function in the FIG. 1 apparatus.

Illustrative circuitry for implementing the function of comb filter 70 is shown in schematic detail in FIG. 1a. Signals appearing at terminal C are capacitively coupled to the input of an emitter follower stage 71, the output of which is supplied to the base of an NPN transistor 73. The emitter of transistor 73 is returned to a negative potential source ($-15$ V.) via resistors 77 and 79, in series. A load resistor 75 is connected between the collector of transistor 73 and a positive potential source (+15 V.). A capacitor 80 is coupled between the emitter of transistor 73 and the emitter of another NPN transistor 83. The emitter of transistor 83 is returned to the negative potential source (−15 V.) via resistor 87, in series with the aforementioned resistor 79. A parallel RC circuit, comprising resistor 85 shunted by capacitor 84, is coupled between the base of transistor 83 and a point of ground potential. A load resistor 89 is connected between the collector of transistor 83 and the positive potential source (+15 V.). Transistors 73 and 83 cooperate in the described circuit arrangement to form a phase splitter developing, across the respective load resistors 75, 89, respective isolated outputs comprising respective versions of the signals from terminal C of mutually opposite phasing.

An ultrasonic delay line 91 is provided which exhibits a delay corresponding to a period at the line frequency $f_H$ (i.e., 64 microseconds, when $f_H$ equals 15,625 Hz.) for signals traveling from its sending end terminals (1, 2) to its receiving end terminals (3, 4). Delay line terminals 2 and 4 are directly connected to a point of ground potential. An inductor 92 is connected between sending end terminals 1 and 2, while a lead provides an effective short circuit between receiving end terminals 3 and 4. A capacitor 90 is coupled between the collector of transistor 73 and the sending end terminal 1 of delay line 91. A resistor 96 is coupled between sending end terminal 1 and a fixed end terminal of a potentiometer 97; an adjustable tap on load resistor 89 is coupled, via a capacitor 93 in series with a resistor 95, to said fixed end terminal of potentiometer 97. The other fixed end terminal of potentiometer 97 is returned to a point of ground potential, while the adjustable tap of potentiometer 97 is capacitively coupled to the output terminal C' of comb filter 70. A frequency response matching network 94 comprising the series combination of a resistor, an inductor, and a variable capacitor is coupled between a point of ground potential and the junction of elements 93 and 95.

The values for inductor 92, and the circuit elements effectively in shunt therewith, are chosen so as to provide delay line 91 with a sending end termination substantially matching the delay line's characteristic impedance. With such a sending end termination, and with the short circuit mistermination effectively provided at the receiving end by the lead between terminals 3 and 4, the delay line 91 is operated in a reflection mode, whereby signals applied to the sending end, and traveling to the receiving end, are reflected thereat for a return traversal of the delay line to the sending end. As a consequence, signals appearing across the sending end termination correspond to the sum of (1) the phase splitter output appearing across load resistor 75, and (2) a 2H delayed (and somewhat attenuated) version thereof. Such summing results in the provision of a frequency response characteristic of the shape shown in FIG. 2b, but with non-zero values for the recurring response minimums. Resistors 95 and 96, and the resistive element of potentiometer 97, form a resistive adding network for combining this sum signal with the other phase splitter output appearing across load resistor 89. With suitable amplitude adjustment (by tap position selection on resistor 89) for the adder input supplied from load resistor 89, achievement of the characteristic of FIG. 2b with response values of substantially zero at the recurring response minimums may be effected for the comb filter 70. With suitable adjustment of network 94 in the path of the adder input supplied from load resistor 89, compensation may be introduced for the effect of the frequency response characteristic of delay line 91 on the other adder input.

Figure 2C:
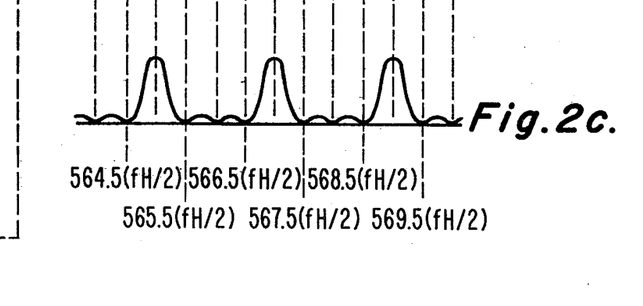

In the FIG. 1 system, the up-converted composite signal appearing in the output of amplitude modulator 15 is subject to the effect of a comb filter system formed by comb filter 17, 18 in cascade with comb filter 70 in the derivation of a chrominance component input for the color demodulators 64. The overall frequency response characteristic of this comb filter system, as shown in FIG. 2c, comprises a plurality of regularly spaced pass bands, which are centered about odd integral multiples of $f_H/2$, but which are significantly narrowed relative to the spaced pass bands that are obtained (see FIG. 2a) when using only comb filter 17, 18. It will be noted that the overall frequency response characteristic of FIG. 2c exhibits nulls at odd integral multiples of $f_H/4$ in addition to nulls provided at even integral multiples of $f_H/2$.

The purpose served by the use of the above-described cascaded comb filter system in the SECAM-output video disc player apparatus of FIG. 1 is protection against undesired "cross-color" effects in color images reproduced by a SECAM color television receiver responding to the player output. For certain scenes containing diagonal edges of particular angles, luminance components are produced which, despite comb filtering of the luminance component prior to recording signal formation, can appear with sufficient residual amplitude, in frequency locations within the spaced pass bands of a comb filter of the FIG. 2a type, to cause the appearance of spurious color information in the output of demodulators 64 if such a comb filter serves alone in effecting chrominance component separation. The nature of SECAM signal production and the SECAM signal processing undertaken in a SECAM color television receiver is such as to render the presence of such spurious color information highly undesirable. With use of the above-described cascaded comb filter system (providing a characteristic of the FIG. 2c type) to effect chrominance component separation, delivery of "diagonal" luminance components to demodulators 64 is substantially precluded.

In several player embodiments described in the previously mentioned copending Carnt, et al. application (e.g., see FIGS. 2 and 3 of the Carnt, et al. application), up-conversion systems, differing from that previously described herein, are employed which translate the buried subcarrier to the standard PAL subcarrier frequency of 4.43361875 MHz. In application of the principles of the present invention to chrominance component separation from an up-converted composite signal of this character, the cascaded comb filter system (17, 18; 70) should be modified so that the respective delay lines 17 and 91 exhibit a delay of 63.943 microseconds (corresponding to the 64 microsecond term of a period at $f_H$, less one quarter of a period at the PAL subcarrier frequency). In this instance, the frequency spacing between adjacent response peaks of the frequency response characteristic of comb filter 17, 18 will differ slightly from $f_H$; the frequency spacing between adjacent response peaks of the frequency response characteristic of comb filter 70 will be half of said slightly differing frequency.

As the characteristic portion illustrated in FIG. 2c shows, when the delays associated with delay lines 17 and 91 are each equal to a period at $f_H$, a response peak coincides with the up-converted color subcarrier frequency of 567 ($f_H/2$) provided in the illustrated FIG. 1 system, and the adjoining response peaks are spaced therefrom by $f_H$. When the delays associated with delay lines are each equal to the aforementioned $1/f_H - \frac{1}{4}f_{SC}$ (with $f_{SC}$ equal to the PAL subcarrier frequency), a response peak will substantially coincide with $f_{SC}$, but the adjoining response peaks will be spaced therefrom by a frequency differing slightly from $f_H$.

What is claimed is:

1. A comb filter system comprising, in combination:
   first comb filter means having an input and an output, and having a frequency response characteristic exhibiting a plurality of regularly spaced response peaks, with the separation between adjacent ones of said regularly spaced response peaks of said first comb filter means corresponding to a first frequency;
   second comb filter means having an input and an output, and having a frequency response characteristic exhibiting a plurality of regularly spaced response peaks, with the frequency of one of said regularly spaced response peaks of said second comb filter means substantially coinciding with the frequency of one of said regularly spaced response peaks of said first comb filter means, and with the separation between adjacent ones of said regularly spaced response peaks of said second comb filter means corresponding to a second frequency, different from said first frequency; wherein one of said first and second frequencies corresponds to an even integral multiple of the other of said first and second frequencies;
   means for coupling the output of said first comb filter means to the input of said second comb filter means; and
   means for deriving a filtered version of signals applied to the input of said first comb filter means from the output of said second comb filter means.

2. A system in accordance with claim 1 wherein said second frequency is substantially equal to half said first frequency.

3. A comb filter system comprising, in combination:
   first comb filter means having an input and an output, and having a frequency response characteristic exhibiting a plurality of regularly spaced response peaks, with the separation between adjacent ones of said regularly spaced response peaks of said first comb filter means corresponding to a first frequency;
   second comb filter means having an input and an output, and having a frequency response characteristic exhibiting a plurality of regularly spaced response peaks, with the frequency of one of said regularly spaced response peaks of said second comb filter means substantially coinciding with the frequency of one of said regularly spaced response peaks of said first comb filter means, and with the separation between adjacent ones of said regularly spaced response peaks of said second comb filter means corresponding to a second frequency, different from said first frequency;
   means for coupling the output of said first comb filter means to the input of said second comb filter means; and
   means for deriving a filtered version of signals applied to the input of said first comb filter means from the output of said second comb filter means;
   wherein said second frequency is substantially equal to half said first frequency; and
   wherein said second comb filter means comprises:
   an ultrasonic delay line having a sending end and a receiving end, and exhibiting a delay corresponding to a period at said first frequency;
   a phase splitter having an input coupled to the output of said first comb filter means, and having a pair of mutually oppositely phased outputs;
   means for coupling one of the outputs of said phase splitter to said sending end of said delay line;
   means for providing a short circuit termination for said receiving end of said delay line; and
   signal combining means, having a pair of inputs, coupled respectively to the other of said outputs of said phase splitter, and to said sending end of said delay line.

4. A comb filter system in accordance with claim 3 for use in the filtering of carrier waves modulated in amplitude by composite color television signals including a luminance component and a chrominance component, said luminance component occupying a given band of frequencies, and said chrominance component comprising modulated color subcarrier waves, with the frequency of said color subcarrier lying within the boundaries of said given band; said comb filter system also including:
   means for applying said modulated carrier waves to the input of said first comb filter means; and
   chrominance component utilization means coupled to the output of said deriving means; and
   wherein the frequency of said one of said regularly spaced response peaks of said second comb filter means is also substantially coincident with a sideband frequency of said modulated carrier waves produced by said color subcarrier.

5. A system in accordance with claim 4 wherein said first frequency is substantially equal to the line frequency of said composite color television signals.

6. A system in accordance with claim 5 wherein said first comb filter means comprises:
   a signal delay device providing a delay corresponding to a period at said line frequency; and
   signal combining means coupled to the input and to the output of said signal delay device.

7. A system in accordance with claim 6 wherein said chrominance component utilization means comprises:
   means for demodulating said modulated color subcarrier waves to recover color-difference signal information; and
   modulator means responsive to said recovered color-difference signal information for forming an output chrominance component encoded in the SECAM format.

8. A signal separation system, for use with composite signals including frequency interleaved luminance and chrominance components, said chrominance component comprising modulated color subcarrier waves; said system comprising:
   first comb filter means having an input and an output, and having a frequency response characteristic exhibiting a plurality of regularly spaced response peaks, with the frequency of one of said regularly spaced response peaks of said first comb filter means substantially coinciding with a frequency occupied by said color subcarrier in said composite signals, and with the separation between adjacent ones of said regularly spaced response peaks of said first comb filter means substantially corresponding to the line frequency of said luminance and chrominance components;

means for applying said composite signals to the input of said first comb filter means;

second comb filter means having an input and an output, and having a frequency response characteristic exhibiting a plurality of regularly spaced response peaks, with the frequency of one of said regularly spaced response peaks of said second comb filter means substantially coinciding with said frequency occupied by said color subcarrier, and with the separation between adjacent ones of said regularly spaced response peaks of said second comb filter means substantially corresponding to half the line frequency of said luminance and chrominance components;

means for coupling the output of said first comb filter means to the input of said second comb filter means; and chrominance component utilization means coupled to the output of said second comb filter means.

9. A system in accordance with claim 8 wherein said first frequency is substantially equal to the line frequency of said luminance and chrominance components, and wherein said second frequency is substantially equal to half said line frequency.

10. A signal separation system, for use with composite signals including frequency interleaved luminance and chrominance components, said chrominance component comprising modulated color subcarrier waves; said system comprising:

first comb filter means having an input and an output, and having a frequency response characteristic exhibiting a plurality of regularly spaced response peaks, with the frequency of one of said regularly spaced response peaks of said first comb filter means substantially coinciding with a frequency occupied by said color subcarrier in said composite signals, and with the separation between adjacent ones of said regularly spaced response peaks of said first comb filter means corresponding to a first frequency;

means for applying said composite signals to the input of said first comb filter means;

second comb filter means having an input and an output, and having a frequency response characteristic exhibiting a plurality of regularly spaced response peaks, with the frequency of one of said regularly spaced response peaks of said second comb filter means substantially coinciding with said frequency occupied by said color subcarrier, and with the separation between adjacent ones of said regularly spaced response peaks of said second comb filter means corresponding to a second frequency, different from said first frequency;

means for coupling the output of said first comb filter means to the input of said second comb filter means; and chrominance component utilization means coupled to the output of said second comb filter means;

wherein said first frequency is substantially equal to the line frequency of said luminance and chrominance components, and wherein said second frequency is substantially equal to half said line frequency; and wherein said second comb filter means comprises:

an ultrasonic delay line having a sending end and a receiving end, and exhibiting a delay corresponding to a period at said line frequency;

a phase splitter having an input coupled to the output of said first comb filter means, and having a pair of mutually oppositely phased outputs;

means for coupling one of the outputs of said phase splitter to said sending end of said delay line;

means for providing a short circuit termination for said receiving end of said delay line; and means for combining the other of said outputs of said phase splitter with signals appearing at said sending end of said delay line.

11. A system in accordance with claim 10 wherein said first comb filter means comprises:

a signal delay device providing a delay corresponding to a period at said line frequency; and signal combining means coupled to the input and to the output of said signal delay device.

12. A system in accordance with claim 11 wherein chrominance component utilization means comprises:

means for demodulating said modulated color subcarrier waves to recover color-difference signal information therefrom; and modulator means responsive to said recovered color-difference signal information for forming an output chrominance component encoded in the SECAM format.

13. A system in accordance with claim 12, wherein said composite signals are formed by modulation of the amplitude of carrier waves in accordance with composite color television signals recovered from a video record, said recovered signals including a recovered luminance component occupying a given band of frequencies, and a recovered chrominance component comprising modulated color subcarrier waves with a subcarrier frequency corresponding to an odd integral multiple of half said line frequency and lying within said given band; and wherein frequency of said carrier waves is such that said color subcarrier occupies a sideband frequency in the products of said modulation delivered to the input of said first comb filter means, which sideband frequency also corresponds to an odd integral multiple of half said line frequency but lies outside said given band; said system also including:

additional comb filter means for passing said recovered luminance component to the substantial exclusion of said recovered chrominance component; and output composite signal forming means responsive to the output of said additional comb filter means and to said output chrominance component.

14. A signal separation system, for use with composite signals including frequency interleaved luminance and chrominance components, said chrominance component comprising modulated color subcarrier waves; said system comprising:

first comb filter means having an input and an output, and having a frequency response characteristic exhibiting a plurality of regularly spaced response peaks at respective frequencies substantially corresponding to $nf_H/2$, where $f_H$ is the line frequency of said luminance and chrominance components and n is a respectively different one of a series of odd integers, with the frequency of one of said regularly spaced response peaks of said first comb filter means substantially coinciding with a frequency occupied by said color subcarrier in said composite signals;

means for applying said composite signals to the input of said first comb filter means;

second comb filter means having an input and an output, and having a frequency response characteristic exhibiting a plurality of regularly spaced response peaks at respective frequencies substantially corresponding to $n'f_H/4$, where $f_H$ is the line frequency of said luminance and chrominance components and n' is a respectively different one of a series of even integers, with the frequency of one of said regularly spaced response peaks of said second comb filter means substantially coinciding with said frequency occupied by said color subcarrier, means for coupling the output of said first comb filter means to the input of said second comb filter means; and chrominance component utilization means coupled to the output of said second comb filter means.

15. A signal separation system, for use with composite signals including a luminance component occupying a given band of frequencies, and a chrominance component interleaved with said luminance component over only a portion of said given band, said chrominance component comprising modulated color subcarrier waves; said system comprising:

first comb filter means having an input and an output, and having a first frequency response characteristic exhibiting a plurality of regularly spaced response peaks, with the frequency of one of said regularly spaced response peaks of said first frequency response characteristics substantially coinciding with the frequency occupied by said color subcarrier in said composite signals, and with the separation between adjacent ones of said regularly spaced response peaks of said first frequency response characteristic substantially corresponding to the line frequency of said luminance and chrominance components;

means for applying said composite signals to the input of said first comb filter means;

a band pass filter having an input coupled to the output of said first comb filter means, and having a pass band encompassing said portion of said given band to the substantial exclusion of other portions thereof;

second comb filter means having an input coupled to receive signals passed by said band pass filter and an output, and having a second frequency response characteristic different from said first frequency response characteristic and so related thereto that signals traversing said first and second comb filter means in cascade are subjected to an overall frequency response characteristic exhibiting a plurality of regularly spaced response peaks and a plurality of spaced response minima, with the frequency of one of said regularly spaced response peaks of said overall frequency response characteristic substantially coinciding with said frequency occupied by said color subcarrier, with the separation between adjacent ones of said regularly spaced response peaks of said overall frequency response characteristic corresponding to said line frequency, and with said spaced response minima lying at respective frequencies corresponding to $nf_H/2$, where $f_H$ is said line frequency and where n is a respectively different one of a series of even integers, and at other frequencies differing from said respective frequencies by $f_H/4$; and chrominance component utilization means coupled to the output of said second comb filter means.

16. Apparatus in accordance with claim 15 wherein said first comb filter means includes a delay line exhibiting a delay substantially corresponding to a period at said line frequency; said apparatus also including:

third comb filter means, also including said delay line, and having an input responsive to said composite signals and an output; said third comb filter means having a third frequency response characteristic, different from said first and second frequency response characteristics and exhibiting a plurality of regularly spaced response peaks at said respective frequencies corresponding to $nf_H/2$; and luminance component utilization means coupled to said output of said third comb filter means.

17. Apparatus in accordance with claim 16 wherein said chrominance component utilization means comprises:

means for demodulating said modulated color subcarrier waves to recover color-difference signal information therefrom; and modulator means responsive to said recovered color-difference signal information for forming an output chrominance component encoded in the SECAM format; and wherein said luminance component utilization means comprises means for combining the signals passed by said third comb filter means with an output of said modulator means.

18. Apparatus in accordance with claim 17 wherein said second comb filter means comprises:

an ultrasonic delay line having a sending end and a receiving end, an exhibiting a delay corresponding to a period at said line frequency;

a phase splitter having an input coupled to the output of said first comb filter means, and having a pair of mutually oppositely phased outputs;

means for coupling one of the outputs of said phase splitter to said sending end of said delay line;

means for providing a short circuit termination for said receiving end of said delay line; and means for combining the other of said inputs of said phase splitter with signals appearing at said sending end of said delay line.

* * * * *